US008983998B1

(12) United States Patent　　(10) Patent No.: US 8,983,998 B1
Spence　　(45) Date of Patent: Mar. 17, 2015

(54) PRIORITIZING POINTS OF INTEREST IN UNFAMILIAR REGIONS

(71) Applicant: Google Inc., Mountain View, CA (US)

(72) Inventor: Stephen Timothy Spence, London (GB)

(73) Assignee: Google Inc., Mountain View, CA (US)

( * ) Notice: Subject to any disclaimer, the term of this patent is extended or adjusted under 35 U.S.C. 154(b) by 63 days.

(21) Appl. No.: 13/692,985

(22) Filed: Dec. 3, 2012

Related U.S. Application Data

(60) Provisional application No. 61/638,446, filed on Apr. 25, 2012.

(51) Int. Cl.
*G06F 17/30* (2006.01)
*G06F 7/00* (2006.01)

(52) U.S. Cl.
CPC .............................. *G06F 17/30867* (2013.01)
USPC .......................................... 707/767; 707/749

(58) Field of Classification Search
CPC .............. G06Q 30/02; G06Q 30/0255; G06Q 30/0261; G06Q 30/0254; G06Q 30/0256; G06Q 30/0241; G06Q 30/0243; G06Q 30/0269; G06Q 30/0201; G06Q 30/0251; G06Q 30/0277; G06Q 30/06; G06Q 30/0282; G06Q 30/0601; G06Q 30/0631; G06F 17/30867; G06F 17/30864; G06F 17/30761; G06F 17/30241; G06F 17/30035; G06F 17/30817; G06F 17/30828; G06F 17/3087; Y10S 707/944; H04W 4/028; H04W 4/185; H04W 4/206; H04L 67/22; H04L 67/30
USPC ......... 707/721, 723, 724, 733, 734, 735, 737, 707/748, 749, 750, 751, 752, 758, 767, 707/E17.137, 918, 919; 705/1.1, 7.29, 7.32, 705/7.34, 14.4, 14.52, 14.53, 14.57, 14.58, 705/14.6, 14.67, 15
See application file for complete search history.

(56) References Cited

U.S. PATENT DOCUMENTS

| 6,041,311 | A | 3/2000 | Chislenko et al. |
| 6,092,049 | A | 7/2000 | Chislenko et al. |
| 7,739,314 | B2 | 6/2010 | Datar et al. |
| 7,783,702 | B2 | 8/2010 | Liu et al. |

(Continued)

FOREIGN PATENT DOCUMENTS

| WO | WO-2006/043977 | 4/2006 |
| WO | WO-2012/020861 | 2/2012 |

OTHER PUBLICATIONS

Quercia et al., Recommending Social Events from Mobile Phone Location Data, Data Mining (ICDM), 2010 IEEE 10th International Conference on Digital Object Identifier: 10.1109/ICDM.2010.152, Publication Year: 2010, pp. 971-976.*

(Continued)

*Primary Examiner* — Greta Robinson
(74) *Attorney, Agent, or Firm* — McDermott Will Emery LLP (57) ABSTRACT

Various aspects of the subject technology relate to systems, methods, and machine-readable media for prioritizing points of interest. A system is configured to receive a plurality of points of interest (POIs) selected for a user, identify at least one point of interest in the plurality of POIs that has been assigned a rating by a linker entity that is associated with a first geographic region that is associated with the user and a second geographic region that is not associated with the user, prioritize the at least one identified point of interest, and select, based on the prioritizing, a subset of the plurality of POIs to be presented to the user.

18 Claims, 8 Drawing Sheets

(56) References Cited

U.S. PATENT DOCUMENTS

| | | | |
|---|---|---|---|
| 7,962,529 | B1 | 6/2011 | Datar et al. |
| 8,065,254 | B1 | 11/2011 | Das et al. |
| 8,463,295 | B1 * | 6/2013 | Caralis et al. ............. 455/456.3 |
| 8,660,891 | B2 * | 2/2014 | Ramer et al. ................ 705/14.1 |
| 2008/0148330 | A1 | 6/2008 | Liwerant et al. |
| 2009/0234664 | A1 | 9/2009 | Schaffnit et al. |
| 2010/0076968 | A1 * | 3/2010 | Boyns et al. .................. 707/732 |
| 2010/0083338 | A1 | 4/2010 | Chiang |
| 2010/0094996 | A1 | 4/2010 | Samaha |
| 2010/0131979 | A1 | 5/2010 | Sievert et al. |
| 2010/0191680 | A1 | 7/2010 | Lee et al. |
| 2010/0299308 | A1 | 11/2010 | Prasad et al. |
| 2011/0194141 | A1 | 8/2011 | Sweet et al. |
| 2011/0231382 | A1 * | 9/2011 | Xu ................................ 707/706 |
| 2012/0135687 | A1 | 5/2012 | Thorn et al. |
| 2012/0173765 | A1 | 7/2012 | 't Hooft |
| 2012/0176396 | A1 | 7/2012 | Harper et al. |

OTHER PUBLICATIONS

Noulas et al., A Random Walk around the City: New Venue Recommendation in Location-Based Social Networks, Privacy, Security, Risk and Trust (PASSAT), 2012 International Conference on and 2012 International Conference on Social Computing (SocialCom), Digital Object Identifier: 10.1109/Social/Com-PASSAT.2012.70, Pub Year:2012, pp. 144-153.*

Bean, "Completely Control Your Mobile Device Via Your Computer," Sep. 8, 2009, 3 pgs, retrieved from <http://everyjoe.com/technology/completely-control-your-mobile-device-via-your-computer/>.

Martin, "iPad mirroring mode on your AppleTV 2: How to do it," Oct. 13, 2011, 3 pgs, retrieved from <http://www.tuaw.com/2011/10/13/ipad-mirroring-mode-on-your-appletv-2-how-to-do-it>.

* cited by examiner

User Record

| Linker Entity | Similarity Score |
|---|---|
| A | .56 |
| B | .34 |
| C | .68 |
| D | .78 |

PRIORITIZING POINTS OF INTEREST IN UNFAMILIAR REGIONS

RELATED APPLICATION

This application claims priority to U.S. provisional patent application 61/638,446, filed on Apr. 25, 2012, "PRIORITIZING POINTS OF INTEREST IN UNFAMILIAR REGIONS," the contents of which are herein incorporated by reference in its entirety.

BACKGROUND

Various services are configured to provide information about points of interest to a user. For example, a local search engine may be configured to receive a user submitted search query, generate search results that include a number of points of interest (e.g., places, businesses, landmarks, etc.) that are related to the search query, and present the search results to the user. In another example, a recommendation engine may also be configured to provide one or more points of interest as recommendations to a user.

SUMMARY

Various aspects of the subject technology relate to a system for prioritizing points of interest. The system may include one or more processors and a machine-readable medium comprising instructions stored therein, which when executed by the one or more processors, cause the one or more processors to perform operations. The operations may include generating a selection of points of interest (POIs) for a user, identifying at least one point of interest in the selection of POIs that has been assigned a rating by a linker entity that is associated with a first geographic region that is associated with the user and a second geographic region that is not associated with the user, prioritizing the selection of POIs based on the identifying of the at least one point of interest, and selecting, based on the prioritizing, a subset of the selection of POIs to be presented to the user.

Various aspects of the subject technology relate to a computer-implemented method for prioritizing points of interest. The method may include receiving a plurality of points of interest (POIs) selected for a user, identifying at least one point of interest in the plurality of POIs that has been assigned a rating by a linker entity that is associated with a first geographic region that is associated with the user and a second geographic region that is not associated with the user, prioritizing the at least one identified point of interest, and selecting, based on the prioritizing, a subset of the plurality of POIs to be presented to the user.

Various aspects of the subject technology relate to a machine-readable medium including instructions stored therein, which when executed by a machine, cause the machine to perform operations for prioritizing points of interest. The operations may include receiving a plurality of points of interest (POIs) selected for a user, identifying at least one point of interest in the plurality of POIs that has been assigned a rating by a linker entity that is familiar with a first geographic region that is familiar to the user and a second geographic region that is not familiar to the user, and prioritizing the plurality of POIs based on the identifying of the point of interest that has been assigned the rating by the linker entity.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The accompanying drawings, which are included to provide further understanding and are incorporated in and constitute a part of this specification, illustrate disclosed aspects and together with the description serve to explain the principles of the disclosed aspects.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be apparent to those skilled in the art that the subject technology may be practiced without these specific details. In some instances, well-known structures and components are shown in block diagram form in order to avoid obscuring the concepts of the subject technology.

Many systems (e.g., local search engines or recommendation engines) are configured to provide points of interest to users. These systems may attempt to provide more personalized points of interest (POIs) that reflect the personal preferences or tastes of a user by identifying points of interest that are similar to points of interest that the user has rated highly and that the user has not yet visited or rated. Similarities between points of interest may be calculated by taking all points of interest that have been rated by all users and identifying patterns in the aggregate rating data.

For example, users that like a first particular point of interest (e.g., the users rated the POI highly) may also tend to like a second point of interest. Accordingly, the system may determine that a first point of interest is similar to a second point of interest. If later, a user that has rated the first point of interest approvingly but has not rated not the second point of interest submits a local search query or requests a recommendation for a point of interest, the system may determine that the second point of interest that the user has not rated is similar to the first point of interest that the user rated highly and present the second point of interest in the search results or as a point of interest recommendation.

Most users, however, tend to rate points of interest that are in an area that the user is familiar with (e.g., where the user lives, works, or frequents). For example, a user living and working in San Francisco, Calif. may have reviewed a number of restaurants, stores, landmarks, or other points of interest in San Francisco and the surrounding areas but few if any in more further areas such as Austin, Tex. or New York City, N.Y. Accordingly, points of interest that are determined to be similar are generally found in the same geographic region and, as a result, a user is likely to be presented with search results or recommendations containing points of interest that are in regions that the user is already familiar with.

According to various aspects of the subject technology, in order to increase the likelihood that points of interest in regions that are unfamiliar to a user are prioritized and presented to the user, the system may identify linker entities that similar to the user and prioritize points of interest in search results that have been rated by the linker entities.

Figure 1:
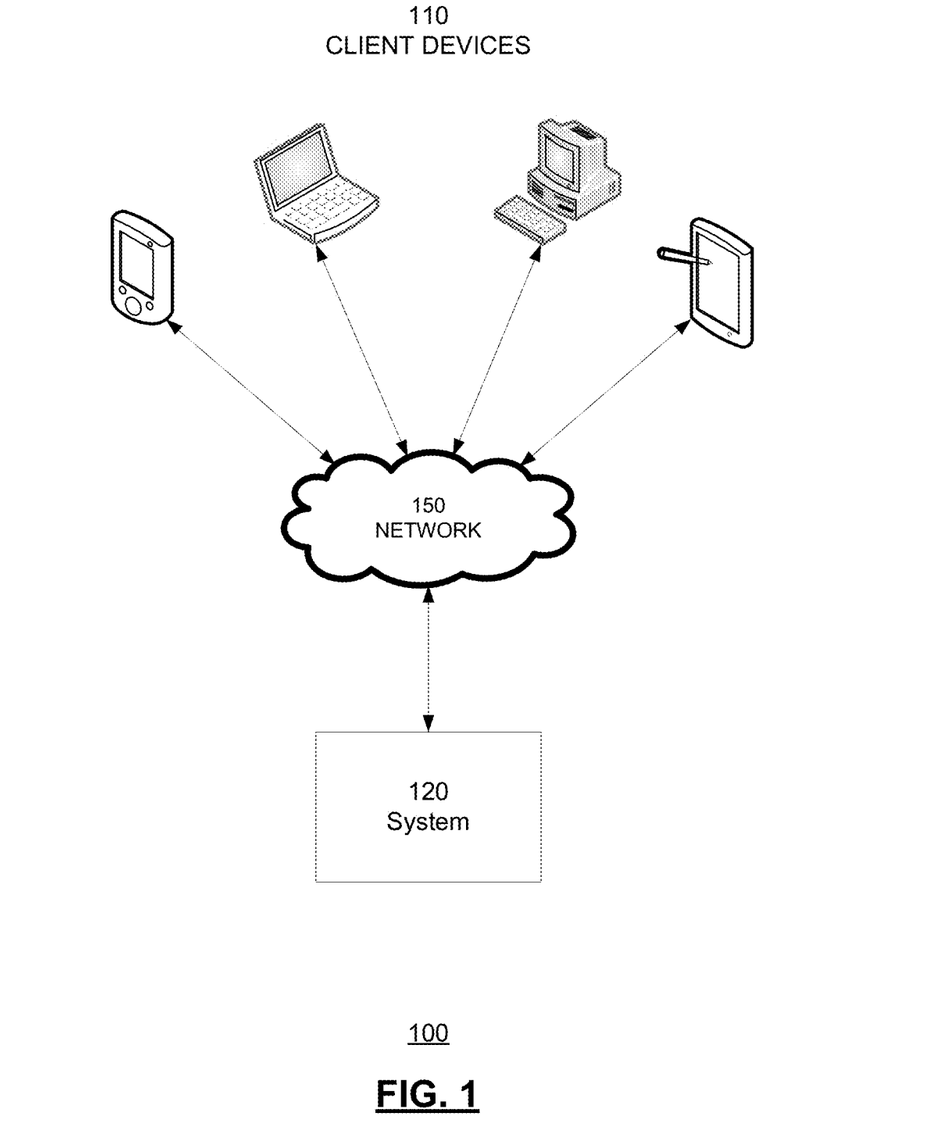
FIG. 1 is a block diagram illustrating an example network environment in which user may be presented with a number of points of interest, in accordance with one aspect of the subject technology.

In example aspects, a user is "familiar" with a geographic region if the user has rated at least a threshold number of points of interest in that geographic region. In other example aspects, the user is "familiar" with the geographic region that they live in, work in, or have other ties to. In addition, as used herein, a "linker entity" for the user is any person that (i) is familiar with at least one geographic region that the user is also familiar with, and (ii) is familiar with at least one other geographic region that the user is unfamiliar with. In example aspects, a linker entity is a machine (e.g., that corresponds to an entity) rather than a person FIG. 1 is a block diagram illustrating an example network environment 100 in which user may be presented with a number of points of interest, in accordance with one aspect of the subject technology. The network environment 100 may include one or more client devices 110 and a system 120 which may be in communication with one another over a network 150 such as the Internet. Although FIG. 1 illustrates a client-server network environment 100, other aspects of the subject technology may include other configurations including, for example, peer-to-peer environments or single system environments.

The client devices 110 may include, for example, desktop computers, mobile computers, tablet computers, mobile devices (e.g., a smart phone or a global positioning system (GPS) device), set top boxes (e.g., for a television), video game consoles, thin clients, or any other devices having appropriate processor, memory, and communications capabilities. The client devices 110 may be configured to run applications (e.g., a web browser, a mobile device application, or other application) that enables a user to receive content including points of interest from the system 120.

The system 120, which may be implemented on one or more servers, may be configured to identify points of interest that may be of interest to the user, prioritize the points of interest based on various factors, and transmit a number of the points of interest to the user on a client device 110 based on the prioritizing of the points of interest. The points of interest may be presented to the user in various situations such as in response to a user submitted local search query or as a recommendation to the user.

The system 120 may generate a list of points of interest and prioritize the list of points of interest based on, among other things, a search query or search parameters, user information, user preferences, or any other information available to the system 120. This information may include, for example, search terms, a location specified in the search terms, location coordinates of the user from the user's client device 110, a history of the user activity on a system, points of interest the user has rated, the rating given to those points of interest, or additional comments about the points of interest. For example, the system 120 may identify a set of points of interest based on similarities between members of the set and points of interest that the user has rated highly (e.g., above threshold rating).

A subset of the list of points of interest may then be transmitted to the user on a client device 110. For example, a number of the points of interest in the list with the highest priority scores may be presented to the user. In another example, all points of interest in the list with a priority score above a threshold priority score may be presented to the user.

According to one aspect, in order to increase the number of points of interest presented to the user that are outside of the geographic regions that the user is familiar with, the system 120 may identify linker entities that are similar to the user and use the points of interest rated by the linker entities to prioritize the points of interest that may be presented to the user.

Each linker entity identified for the user may any person or other entity machine that is familiar with at least one geographic region that the user is also familiar with as well as at least one geographic region that the user is unfamiliar with. According to one aspect, a linker entity or a user may be considered familiar with a geographic region if they have submitted a rating or review of at least a threshold number of points of interest in that geographic region.

Figure 2:
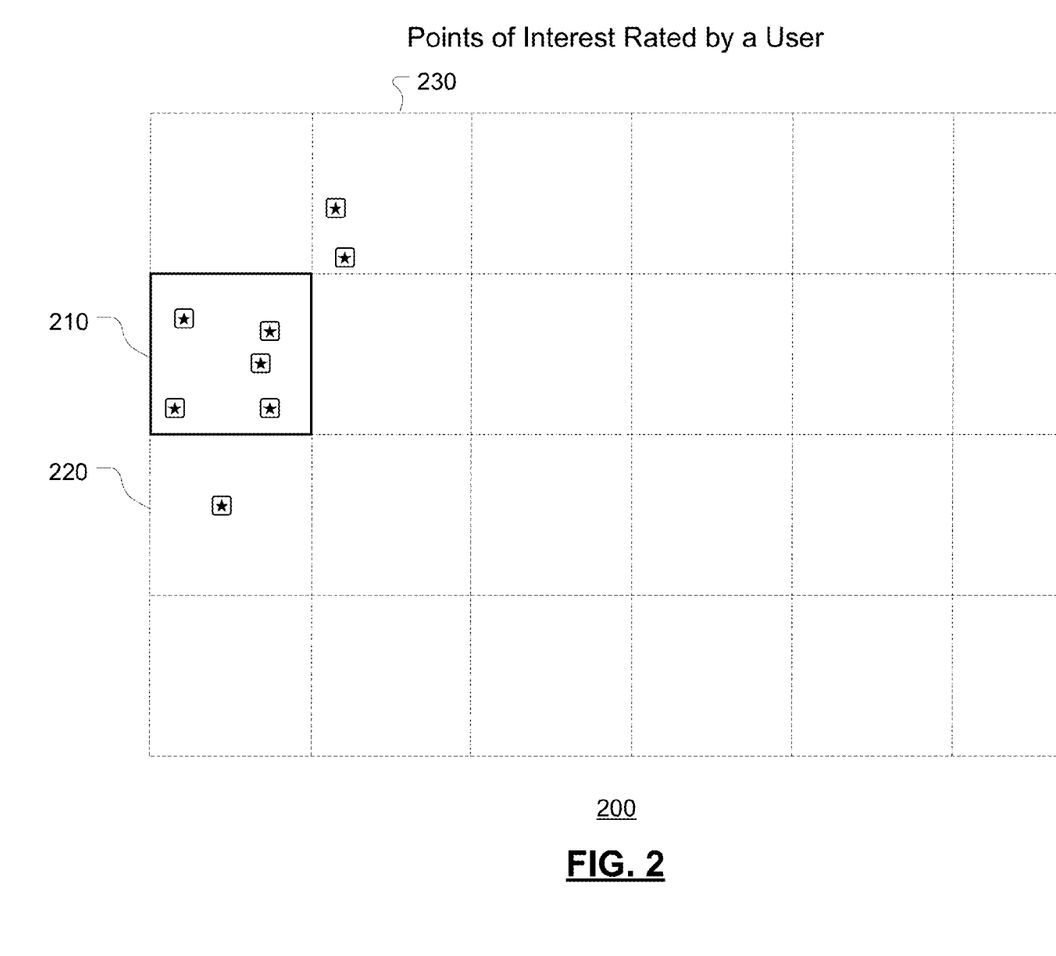
FIG. 2 is an example geographical area showing points of interest rated by a user, in accordance with one aspect of the subject technology.

To illustrate, consider the example geographical area depicted in FIG. 2. FIG. 2 is an example geographical area 200 showing points of interest rated by a user, in accordance with one aspect of the subject technology. Suppose that a user living in a geographic region 210 has rated 5 points of interest (e.g., restaurants, stores, or other businesses) in the geographic region 210. If the threshold number of points of interest to be considered familiar with a geographic region is 3, the user may be considered familiar with geographic region 210. The user may also have rated 1 POI in geographic region 220 and 2 POIs in geographic region 230. However, because the user did not rate at least 3 points of interest (the threshold number of points of interest) in the respective geographic regions the user is not considered familiar with the geographic regions.

Figure 3:
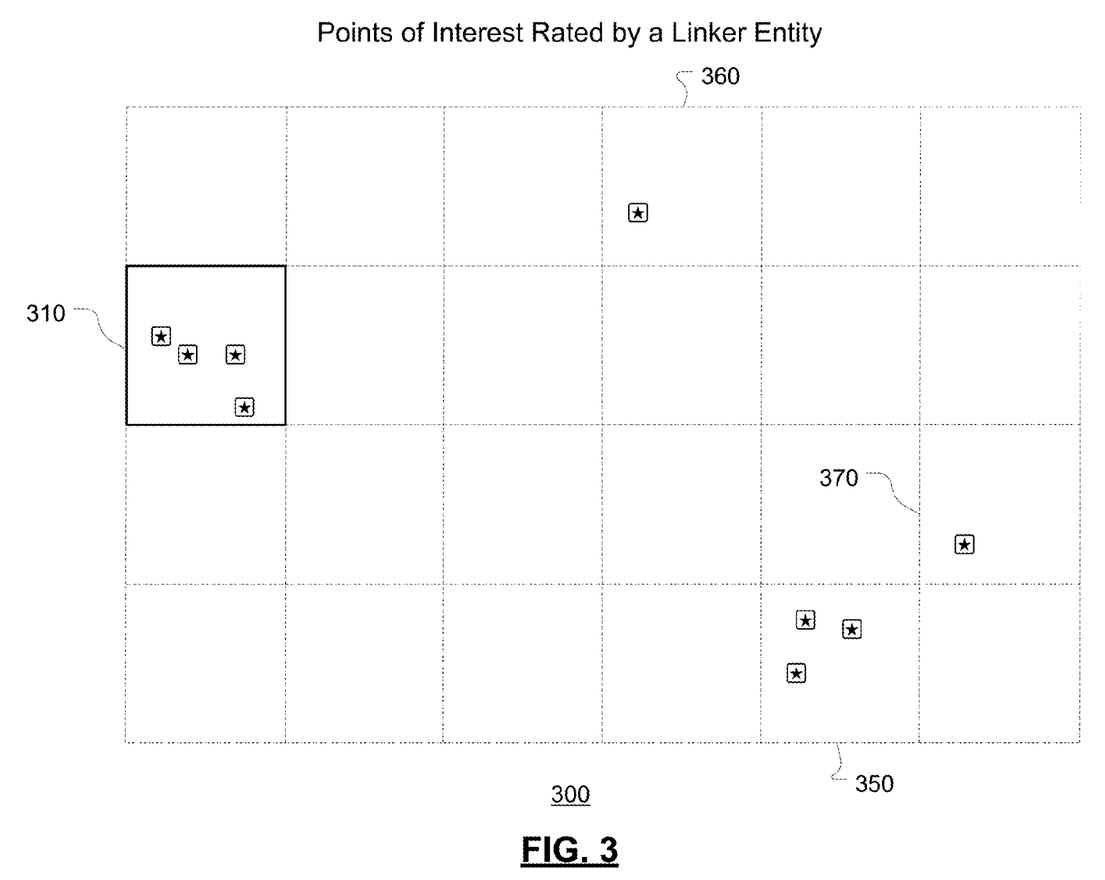
FIG. 3 is an example geographic area showing points of interest rated by a linker entity, in accordance with one aspect of the subject technology.

FIG. 3 is an example geographic area 300 showing points of interest rated by a linker entity, in accordance with one aspect of the subject technology. In FIG. 3, the geographic area 300 is the same as the geographic area 200 shown in FIG. 2. The linker entity may have rated 4 points of interest in geographic region 310 (which is the same as geographic region 210 in FIG. 2), 3 points of interest in geographic region 350, and 1 point of interest in each of geographic regions 360 and 370. Accordingly, the linker entity may be considered familiar with geographic regions 310 and 350. Furthermore, the linker entity is considered a linker entity for the user because the linker entity is familiar with at least one geographic region that the user is also familiar with (e.g., geographic region 310) as well as at least one geographic region that the user is unfamiliar with (e.g., geographic region 350).

According to one aspect of the subject technology, a similarity score may be calculated between a user and each linker entity identified for the user. The similarity score is configured to be a measurement of how similar the linker entity's preferences are to the user's preferences. Accordingly, if the user and a linker entity are very similar (e.g., the linker entity has a high similarity score for the user), the user will probably like a point of interest that the linker entity likes (e.g., rates highly).

The similarity score may be calculated based on a number of factors, such as whether the linker entity and the user rated or reviewed the same or similar points of interest, the rating the linker entity and the user gave to a point of interest, similar words the linker entity and the user used in a review for a point of interest, similarities in the linker entity's and the user's profile information, similarities in the linker entity's and the user's activities, or any other information gathered about the linker entity or the user.

The system may then prioritize a point of interest for a user based on whether or not a linker entity for the user has rated the point of interest and, if so, the rating the linker entity gave the point of interest, and the degree of similarity (e.g., the similarity score) for the linker entity and the user. For example, if the user and the linker entity have a high degree of similarity (e.g., a high similarity score) and the linker entity gave the point of interest a high rating, the system may increase the prioritize the point of interest for presentation to the user by, for example, increasing a rank score for the point of interest. Further details are discussed below with respect to FIG. 4.

Figure 4:
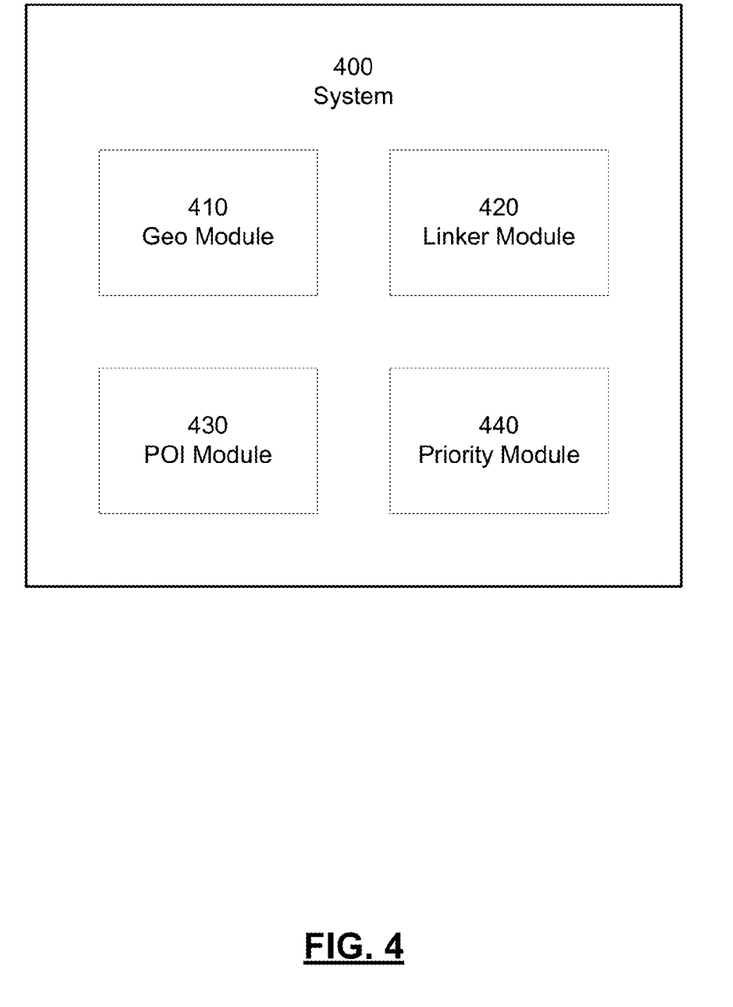
FIG. 4 is a block diagram illustrating an example system for prioritizing points of interest for presentation to a user, in accordance with one aspect of the subject technology.

FIG. 4 is a block diagram illustrating an example system 400 for prioritizing points of interest for presentation to a user, in accordance with one aspect of the subject technology. In one aspect, the system 400 may be a search engine configured to receive a local search query from a client device, process the search query, and transmit to the client device search results that include a number of points of interest. In another aspect, however, the system 400 may be a recommendation engine configured to provide a number of point of interest recommendations to a client device. While the system 400 is shown in one configuration in FIG. 4, in other configurations, the system 400 may include additional, alternative, and/or fewer components.

The system 400 may include a geo module 410, a linker module 420, a point of interest (POI) module 430, and a priority module 440. The geo module 410 may be configured to manage all geographical data. According to one aspect, the geo module 410 may be configured to divide a geographical area (e.g., a city, a country, the world) into geographical regions.

The geographic regions may be determined using many different methods including, for example, by finding natural region boundaries based on the geography and demographics of a geographic location, by using existing borders of political entities or legal jurisdictions (e.g., cities, states, counties, etc.). The geographic regions may also be determined by determining an arbitrary region size and dividing the geographic area into equally sized parts. Another method for determining the geographic regions is to calculate a region size where most ratings of a user are most likely to be found within (e.g., 80% of the ratings for all users are found within an area having a 10 mile radius) and using the calculated region size to divide up the geographic area.

According to another aspect, the system may determine the size of a region by determining the distance, for the average point of interest, for which a particular percentage of related points of interest may be found within. Whether one point of interest is related to another point of interest may be determined based on, for example, the number of users that have rated both points of interest and whether the number of users exceeds a threshold number.

For example, the system may determine that, for the average point of interest, 85% of related points of interest are within 19 kilometers (km). Accordingly, the system may set the region size to be a 19 km by 19 km square. Once the size of the region is determined, the system may divide the map of the geographic area into approximately equal sized areas (e.g., regions that are 20 km by 20 km in size).

Referring back to FIG. 4, the linker module 420 may be configured to identify linker entities for a user and calculate a similarity score for each of the linker entities for the user. After the linker entities are identified and their similarities score are calculated, the linker module 420 may store the linker information in a database for later use.

The POI module 430 may be configured to receive a request for one or more points of interest. For example, the POI module 430 may receive a local search query or a recommendation request from a client device. The request for one or more point of interest may include various parameters (e.g., search parameters or recommendation requisites) or characteristics that the POI module 430 may use to find related POIs.

In response to the request for points of interest, the POI module 430 may access a POI database and identify a number of points of interest related to the request. The POI database may contain listings or records for points of interest known to the system 400. Each listing for a point of interest may include information about the point of interest such as, for example, the name of the POI, a location of the POI (e.g., longitude and latitude coordinates), a unique identifier for the POI, keywords or categories associated with the POI, or other information about the POI.

Once a number of points of interest are identified by the POI module 430, the priority module 440 may prioritize the points of interest and select the points of interest that will be transmitted to the client device, for example, as search results or point of interest recommendations. The points of interest may be prioritized based on various signals, such as the request parameters, user information, user preferences, or any other information available to the priority module 440.

The points of interest also may be prioritized based on linker entities associated with the user, similarity scores for the linker entities, the points of interest that the linker entities have rated, and the ratings that the linker entities assigned to the points of interest. According to one aspect, the priority module 440 may prioritize the points of interest by assigning each point of interest a priority score.

Using the priority scores, the priority module 440 may select a subset of the points of interest to be presented to a user on a client device. For example, the priority module 440 may select the 5, 10, 25, or other number of points of interest with the highest priority scores to send to the user. In another example, the priority module 440 may select points of interest with priority scores that exceed a threshold priority score.

By prioritizing points of interest that may be presented to a user using information associated with the user's linker entities which are familiar with geographic regions that are unfamiliar to the user, the system may be able to increase the likelihood that points of interest in regions that are unfamiliar to a user are provided to the user (e.g., in search results or point of interest recommendations). Further details with respect to the process of prioritizing the points of interest for display are discussed below with respect to the figures.

Figure 5:
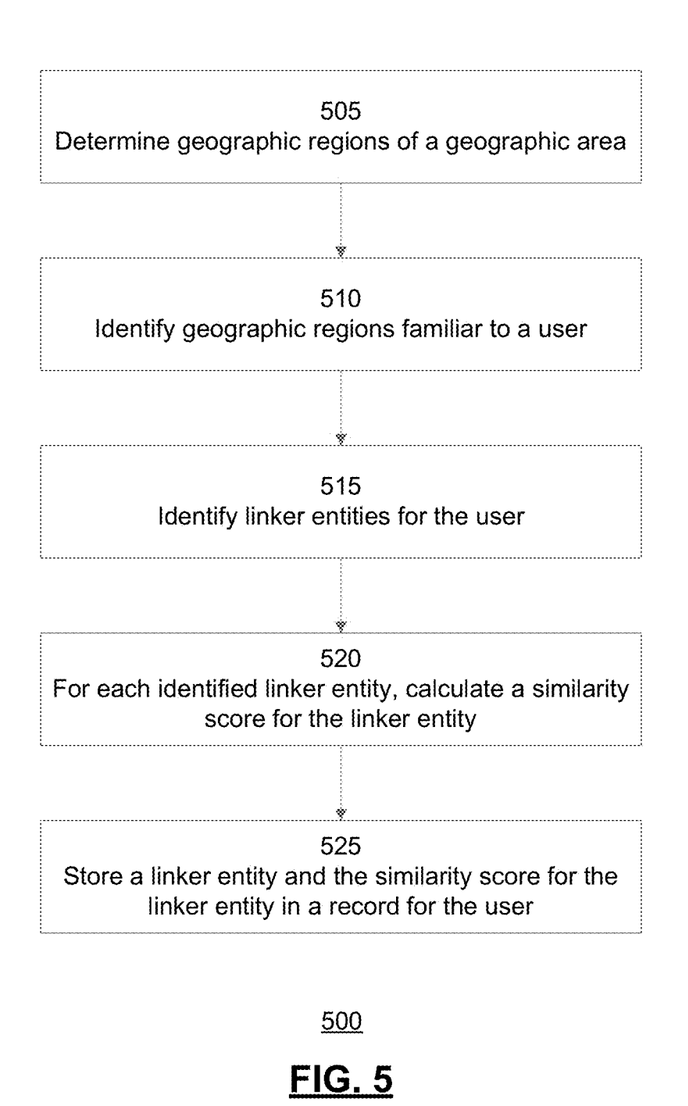
FIG. 5 is a flow chart illustrating an example process for identifying linker entities for a user, in accordance with one aspect of the subject technology.

In order to present users with one or more points of interest in unfamiliar regions, the system may be configured to first identify linker entities for the user. FIG. 5 is a flow chart illustrating an example process 500 for identifying linker entities for a user, in accordance with one aspect of the subject technology. Although the steps in FIG. 5 are discussed with respect to the modules of system 400 illustrated in FIG. 4, the steps are not limited to these modules. Furthermore, although the steps are shown in one particular order, other orderings of steps are also possible.

In order to identify linker entities for a user, the geo module 410 of system 400 may determine the geographic regions in a geographic area (e.g., a city, a state, a country, the world, etc.) at step 505. In one aspect, the regions of a geographic area may be predetermined by another system. In another aspect, the system may determine the regions, as described above, for all users or for each individual user.

At step 510, the linker module 420 may identify one or more geographic regions that are familiar to a user. In one aspect, a user is familiar with a particular geographic region if the user has reviewed a threshold number of points of interest within the particular geographic region. According to other aspects, however, a user may also be familiar with a geographic region if the user resides within the geographic region, works within the geographic region, or has some other tie with the geographic region.

Based on the geographic regions familiar to the user, at step 515, the linker module 420 may identify one or more linker entities for the user that are familiar with at least one geographic regions that is also familiar to the user and at least one geographic region that is unfamiliar to the user. As mentioned above, a linker entity may be familiar to a geographic region if the linker entity has rated at least a threshold number of points of interest located within the geographic region. The threshold number of POIs in a geographic region needed to render a linker entity familiar with the geographic region may or may not be the same threshold number needed to render a user familiar with a geographic region.

At step 520, for each linker entity identified for the user, the linker module 420 may calculate a similarity score for the linker entity that measures how similar the linker entity is to the user. The similarity score may be calculated based on factors such as whether or not the linker entity and the user rated the same or a similar point of interest (POI) and whether the linker entity and the user gave the same or a similar rating to that POI (e.g., if both the linker entity and the user gave a restaurant 4 out of 5 stars).

According to one aspect, the similarity score may be calculated based on a number of regional similarity scores. For example, a regional similarity score may be calculated for each geographic region that is familiar to both the linker entity and the user. The regional similarity scores may then be combined (e.g., averaged) in order to arrive at the similarity score for the linker entity.

According to one aspect, if the regional similarity scores for all of the geographic regions that are familiar to both the linker entity and the user are above a predetermined regional similarity score threshold, the final similarity score for the linker receive an additional boot. If, on the other hand, one or more of the regional similarity scores are below the predetermined regional similarity score threshold, the similarity score for the region may be ignored or discarded when calculating the combined similarity score for the linker entity. According to another aspect, however, the combined similarity score for the linker entity may be decreased if one or more of the regional similarity scores are below the threshold.

The similarity score for a linking entity may also be calculated based on other information associated with the linker entity and the user such as profile information and activity information. The profile information may include, for example, the age, sex, and address for a user or a linker entity. The profile information may also include groups the user or linker entity is associated with or other demographic information. Activity information may include sites or features that a user or linker entity uses or any other activity history accessible to the system 400.

Figure 6:
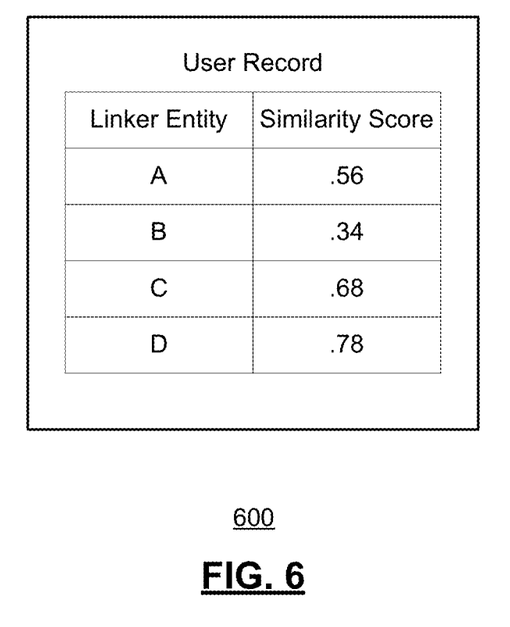
FIG. 6 is a block diagram illustrating an example record, according to one aspect of the subject technology.

After a similarity score is calculated for the user's linker entities, at step 525, the linker module 420 may store an identifier for the linker entities and their respective similarity scores in a record or profile associated with the user. For example, FIG. 6 is a block diagram illustrating an example record 600, according to one aspect of the subject technology.

In some aspects, the record 600 may only store a predetermined number of entries for linker entities. Accordingly, only the linker entities with the highest similarity scores may be stored in the record 600. In another aspect, the linker module 420 may be configured to store in the record 600 an entry for all linker entities that have a similarity score that exceeds a threshold similarity score.

Figure 7:
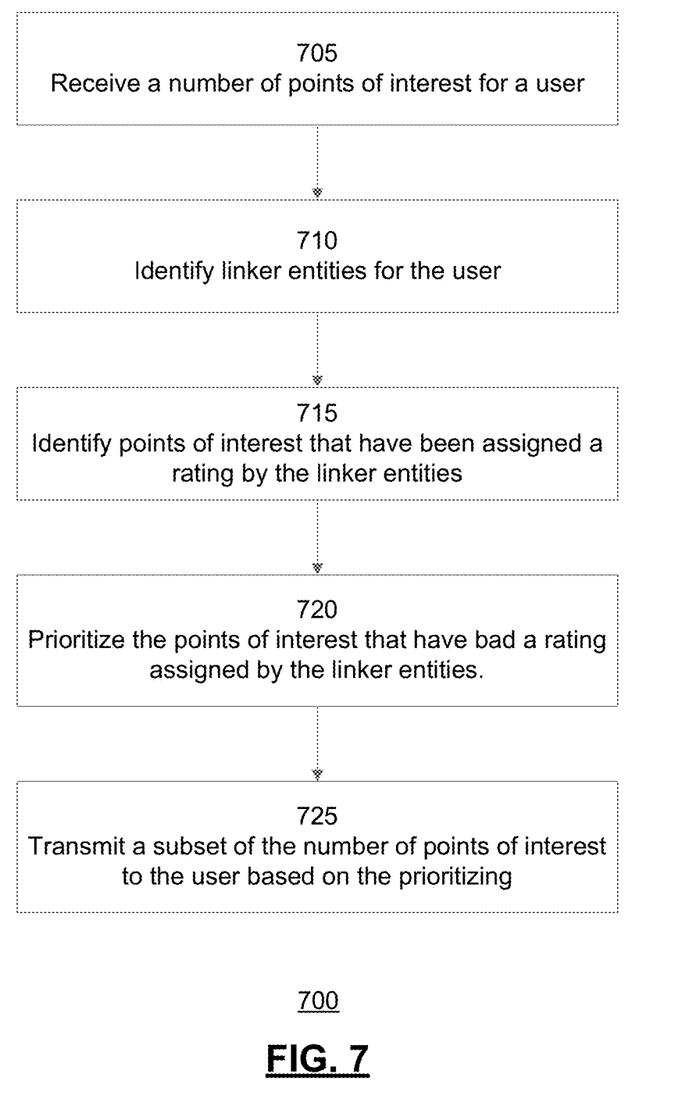
FIG. 7 is a flow chart illustrating an example process for prioritizing points of interest based on linker entities associated with a user, in accordance with one aspect of the subject technology.

After the linker entities for a user are identified and the similarity scores are calculated, the system 400 may be able to prioritize points of interest based on points of interest rated by linker entities. For example, FIG. 7 is a flow chart illustrating an example process 700 for prioritizing points of interest based on linker entities associated with a user, in accordance with one aspect of the subject technology. Although the steps in FIG. 7 are discussed with respect to the modules of system 400 illustrated in FIG. 4, the steps are not limited to these modules. Furthermore, although the steps are shown in one particular order, other orderings of steps are also possible.

At step 705, the POI module 430 may receive a number of points of interest for a user. The points of interest may be generated by the system 400 or another system in response to a request for one or more points of interest such as a local search query or a request for a point of interest recommendation. In some cases, the number of points of interest generated in response to the request may be numerous.

According to one aspect, the generated points of interest may be prioritized by, for example, assigning each point of interest a rank score which may be used to selecting points of interest that are to be presented to the user based on the prioritization or order the points of interest to be presented to the user. The rank score may be calculated based on various factors such as request parameters, user preferences, a specified location, or any other information available.

In order to increase the likelihood that points of interest in regions that are unfamiliar to the user will be prioritized, the system 400 may also prioritize the points of interest based on the points of interest rated by linker entities for the user. As an example, at step 710, the priority module 440 may identify a number of linker entities for the user. As discussed above, the linker entities for the user may be stored in a record, such as user record 600 in FIG. 6, along with respective similarity scores for the linker entities.

At step 715, the priority module 440 may identify points of interest in the set of generated points of interest that have also been assigned a rating by one of the linker entities for the user. These identified points of interest may then be prioritized at step 720.

According to one aspect of the subject technology the priority module 440 may prioritize the identified points of interest by modifying the rank score associated with each of the identified points of interest. The amount that a rank score for an identified point of interest is modified may vary based on factors such as a rating assigned by a linker entity, the similarity score for the linker entity that rated the point of interest, or the number of linker entities that rated a point of interest.

For example, if a linker entity with a high similarity score gave a high rating to a point of interest, the rank score for the point of interest may be increased by a certain amount. If another linker entity with a lower similarity score gave a similarly high rating to another point of interest, the ranks for that point of interest may be increased by a lesser amount. In another aspect, more than one linker entity rated the same point of interest, the priority module 440 may increase the rank score for that point of interest.

After the points of interest are prioritized, the points of interest may then be transmitted to and displayed on the user's client device based on the prioritization. For example, at step 725, the priority module 440 may select a subset of the points of interest received at step 705 based on their respective rank scores and transmit the subset of the to the user's client device where they may be displayed.

According to another aspect, instead of (or in addition to) modifying the rank score for the points of interest identified at step 715, the priority module 440 may also be configured to flag the points of interest so that when they are presented to a user, the points of interest may be annotated with a symbol, label, or other indication that signals to the user that the points of interest are recommended or have a heightened priority.

By identifying linker entities that have rated points of interest in geographic regions that are familiar to a user as well as geographic regions that are unfamiliar to the user, the system is able to increase the likelihood that points of interest in regions that are unfamiliar to a user are presented to the user. In some aspects, in order to prevent too many points of interest in unfamiliar geographic regions from being presented to the user, the number of points of interest located in geographic regions that are unfamiliar to the user may be capped at a predetermined number. The predetermined number may be calculated based on, for example, search parameters, user location, or other factors.

Figure 8:
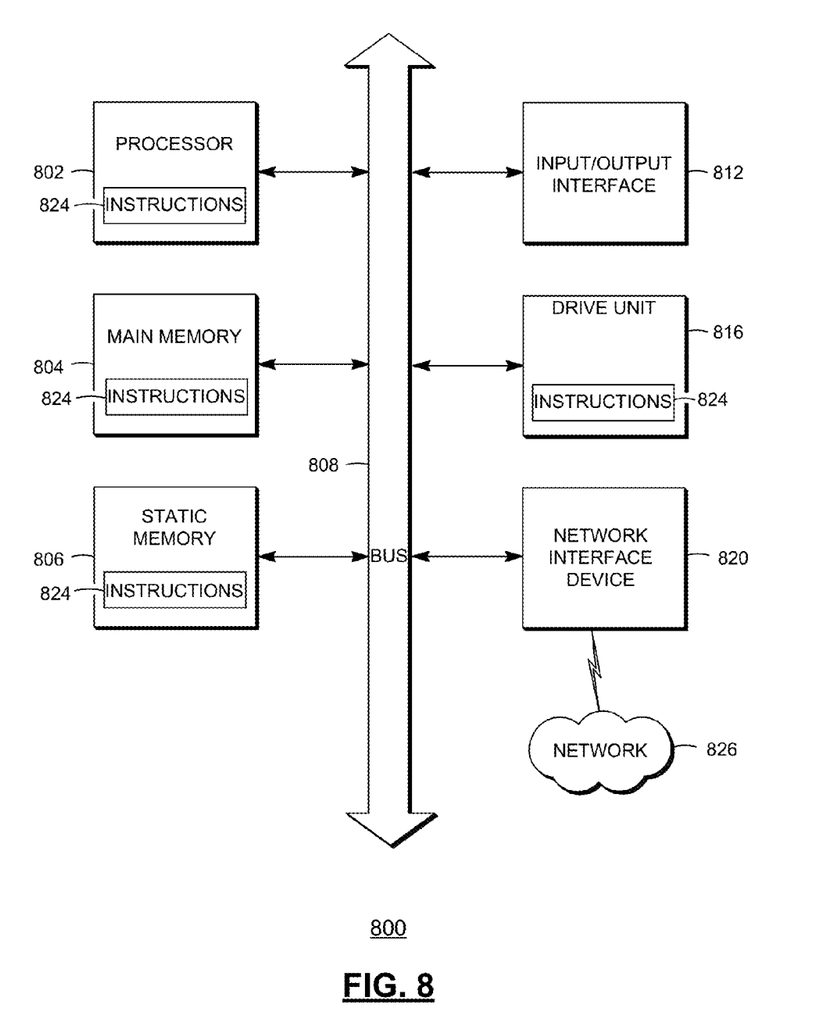
FIG. 8 is a block diagram illustrating a computer system with which any of the client devices or systems described herein may be implemented.

FIG. 8 is a block diagram illustrating a computer system 800 with which any of the client devices or systems described herein may be implemented. In certain aspects, the computer system 800 may be implemented using hardware or a combination of software and hardware, either in a dedicated server, or integrated into another entity, or distributed across multiple entities.

The example computer system 800 includes a processor 802, a main memory 804, a static memory 806, a disk drive unit 816, and a network interface device 820 which communicate with each other via a bus 808. The computer system 800 may further include an input/output interface 812 that may be configured to communicate with various input/output devices such as video display units (e.g., liquid crystal (LCD) displays, cathode ray tubes (CRTs), or touch screens), an alphanumeric input device (e.g., a keyboard), a cursor control device (e.g., a mouse), or a signal generation device (e.g., a speaker).

Processor 802 may be a general-purpose microprocessor (e.g., a central processing unit (CPU)), a graphics processing unit (GPU), a microcontroller, a Digital Signal Processor (DSP), an Application Specific Integrated Circuit (ASIC), a Field Programmable Gate Array (FPGA), a Programmable Logic Device (PLD), a controller, a state machine, gated logic, discrete hardware components, or any other suitable entity that can perform calculations or other manipulations of information.

A machine-readable medium (also referred to as a computer-readable medium) may store one or more sets of instructions 824 embodying any one or more of the methodologies or functions described herein. The instructions 824 may also reside, completely or at least partially, within the main memory 804 and/or within the processor 802 during execution thereof by the computer system 800, with the main memory 804 and the processor 802 also constituting machine-readable media. The instructions 824 may further be transmitted or received over a network 826 via the network interface device 820.

The machine-readable medium may be a single medium or multiple media (e.g., a centralized or distributed database, and/or associated caches and servers) that store the one or more sets of instructions. The machine-readable medium may comprise the drive unit 816, the static memory 806, the main memory 804, the processor 802, an external memory connected to the input/output interface 812, or some other memory. The term "machine-readable medium" shall also be taken to include any non-transitory medium that is capable of storing, encoding or carrying a set of instructions for execution by the machine and that cause the machine to perform any one or more of the methodologies of the aspects discussed herein. The term "machine-readable medium" shall accordingly be taken to include, but not be limited to, storage mediums such as solid-state memories, optical media, and magnetic media.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system.

Skilled artisans may implement the described functionality in varying ways for each particular application. For example, the modules may include software instructions encoded in a medium and executed by a processor, computer hardware components, or a combination of both. The modules may each include one or more processors or memories that are used to perform the functions described below. According to another aspect, the various systems and modules may share one or more processors or memories. Various components and blocks may be arranged differently (e.g., arranged in a different order, or partitioned in a different way) all without departing from the scope of the subject technology.

It is understood that the specific order or hierarchy of steps in the processes disclosed is an illustration of exemplary approaches. Based upon design preferences, it is understood that the specific order or hierarchy of steps in the processes may be rearranged. Some of the steps may be performed simultaneously.

The previous description is provided to enable any person skilled in the art to practice the various aspects described herein. The previous description provides various examples of the subject technology, and the subject technology is not limited to these examples. Various modifications to these aspects will be readily apparent to those skilled in the art, and the generic principles defined herein may be applied to other aspects.

A phrase such as an "aspect" does not imply that such aspect is essential to the subject technology or that such aspect applies to all configurations of the subject technology. A disclosure relating to an aspect may apply to all configurations, or one or more configurations. An aspect may provide one or more examples. A phrase such as an aspect may refer to one or more aspects and vice versa. A phrase such as an "aspect" does not imply that such aspect is essential to the subject technology or that such aspect applies to all configurations of the subject technology. A disclosure relating to an aspect may apply to all aspects, or one or more aspects. An aspect may provide one or more examples. A phrase such an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A configuration may provide one or more examples. A phrase such a configuration may refer to one or more configurations and vice versa.

What is claimed is:

1. A computer-implemented method for prioritizing points of interest, the method comprising:
   receiving a plurality of points of interest (POIs) selected for a first user in response to a search query submitted by the first user, wherein the first user has assigned ratings to at least a threshold number of points of interest in a first geographic region but not in a second geographic region, the second geographic region being at least a threshold distance away from the first geographic region;
   identifying a second user who has assigned ratings to at least the threshold number of points of interest in both the first geographic region and the second geographic region;
   identifying at least one point of interest in the plurality of POIs that has been assigned a rating by the second user, wherein the at least one identified point of interest is in the second geographic region;
   prioritizing the at least one identified point of interest among the plurality of POIs based on the rating by the second user of the at least one identified point of interest; and
   selecting, based on the prioritizing, a subset of the plurality of POIs to be presented to the first user.

2. The computer-implemented method of claim 1, further comprising:
   calculating a similarity score for the second user; and
   storing an identifier for the second user and the similarity score for the second user in a record.

3. The computer-implemented method of claim 2, wherein the similarity score is calculated based on at least one of a number of common points of interest that the second user and the first user have both rated and a similarity in rating assigned to a point of interest by the second user and the first user.

4. The computer-implemented method of claim 2, wherein the prioritizing of the at least one identified point of interest among the plurality of POIs is further based on the similarity score for the second user.

5. The computer-implemented method of claim 1, wherein the prioritizing of the at least one identified point of interest among the plurality of POIs is based on a number of linker entities that have assigned a rating to the at least one identified point of interest.

6. The computer-implemented method of claim 1, wherein the prioritizing of the at least one identified point of interest among the plurality of POIs comprises modifying a rank score associated with the at least identified one point of interest.

7. The computer-implemented method of claim 1, wherein the plurality of POIs selected for the first user are selected in response to a search query submitted by the first user.

8. The computer-implemented method of claim 1, wherein the plurality of POIs selected for the first user are selected as recommendations for the first user.

9. The computer-implemented method of claim 1, further comprising transmitting the subset of the plurality of POIs to a client device to be presented to the first user.

10. The computer-implemented method of claim 1, further comprising partitioning a geographic area into a plurality of geographic regions.

11. A system for prioritizing points of interest, the system comprising:
   one or more processors; and
   a machine-readable medium comprising instructions stored therein, which when executed by the one or more processors, cause the one or more processors to perform operations comprising:
      generating a selection of points of interest (POIs) for a first user in response to a search query submitted by the first user, wherein the first user has assigned ratings to at least a threshold number of points of interest in a first geographic region but not in a second geographic region, the second geographic region being at least a threshold distance away from the first geographic region;
      identifying a second user who has assigned ratings to at least the threshold number of points of interest in both the first geographic region and the second geographic region;
      identifying at least one point of interest in the selection of POIs that has been assigned a rating by the second user, wherein the at least one identified point of interest is in the second geographic region;
      prioritizing the selection of POIs based on the rating by the second user of the at least one identified point of interest; and
      selecting, based on the prioritizing, a subset of the selection of POIs to be presented to the first user.

12. The system of claim 11, wherein the operations further comprise:
   calculating a similarity score for the second user based on at least one of a number of points of interest that the second user and the first user have both rated and a similarity in rating assigned to a point of interest by the second user and the first user; and
   wherein the prioritizing of the selection of POIs is based on the similarity score for the second user that has assigned the rating to the at least one point of interest.

13. The system of claim 11, wherein the prioritizing of the selection of POIs comprises increasing a rank score associated with the at least one identified point of interest.

14. A non-transitory machine-readable medium comprising instructions stored therein, which when executed by a machine, cause the machine to perform operations comprising:
   receiving a plurality of points of interest (POIs) selected for a first user in response to a search query submitted by the first user, wherein the first user has assigned ratings to at least a threshold number of points of interest in a first geographic region but not in a second geographic region, the second geographic region being at least a threshold distance away from the first geographic region;

identifying a second user who has assigned ratings to at least the threshold number of points of interest in both the first geographic region and the second geographic region;

identifying a point of interest in the plurality of POIs that has been assigned a rating by the second user, wherein the at least one identified point of interest is in the second geographic region; and prioritizing the plurality of POIs based on the rating by the second user of the identified point of interest.

15. The non-transitory machine-readable medium of claim 14, wherein the prioritizing of the plurality of POIs is further based on a similarity score for the second user.

16. The non-transitory machine-readable medium of claim 14, wherein the operations further comprise:

receiving a search query submitted by the first user; and selecting, in response to the receiving of the search query, a subset of the plurality of POIs to present to the first user based on the prioritizing of the plurality of POIs.

17. The non-transitory machine-readable medium of claim 16, wherein the operations further comprise transmitting the subset of the plurality of POIs to a client device to be presented to the first user.

18. The non-transitory machine-readable medium of claim 14, wherein the operations further comprise partitioning a geographic area into a plurality of geographic regions.

* * * * *